Patented Feb. 11, 1930

1,746,895

UNITED STATES PATENT OFFICE

IRVIN W. HUMPHREY, OF DOVER, NEW JERSEY, ASSIGNOR TO HERCULES POWDER COMPANY, OF WILMINGTON, DELAWARE, A CORPORATION OF DELAWARE

LACQUER

No Drawing.    Application filed June 10, 1926. Serial No. 115,128.

My invention relates to lacquers and more especially to those lacquers which include a nitrated product, for example, nitrocellulose, as a constituent.

Heretofore in certain applications for Letters Patent of the United States filed by Irvin W. Humphrey Serial No. 751,682, filed November 22, 1924 and Serial No. 50,839, filed August 17, 1925, there were disclosed lacquers including as an ingredient oxidized pine oil.

Oxidized pine oil as an ingredient of lacquer is possessive of merit in that it possesses the property of dissolving the gums and resins used in lacquers and in that it serves, to some extent, as a substitute for castor oil and other substances which are used to produce a film of high flexibility. Oxidized pine oil containing, as a result of oxidation, camphor and fenchone, also has a colloiding effect on the nitrocellulose, included as a constituent of the lacquer, and may be utilized in partial or full substitute for the previously used colloiding agents.

While the use of oxidized pine oil in lacquers is advantageous and results in the production of a superior lacquer, the process necessary for the production of the oxidized pine oil is substantially expensive.

Now it is the object of my present invention to provide an ingredient for lacquers which will enable the production of a lacquer possessing a high degree of merit and superiority and produceable at a minimum cost.

In accordance with my invention, I utilize as an ingredient for lacquers, pine oil, preferably untreated chemically, which may be produced for example either by steam or destructive distillation of pine stumps. Pine oil is composed largely of terpene alcohols, and has a specific gravity of about 0.93 and a boiling range of from about 200° C. to about 225° C.

Pine oil is usually obtained by fractional distillation, of the volatile oil from pine stumps, as a final cut after distilling off turpentine, composed largely of terpene hydrocarbons, as a first cut and dipentine, as a middle cut.

The pine oil for use in the production of lacquers in accordance with my invention is preferably untreated chemically, and may be used with the usual ingredients of lacquers including nitrated products, gums, colloiding agents and plasticizers, it only being necessary to include a sufficient amount of colloiding agent to desirably colloid the nitrated product, since pine oil is not itself a solvent for nitrated products.

Wide variations are permissible in the amount of pine oil which may be used in the production of lacquer, the amount ranging from say 1%–20%.

As a typical formula for the production of a lacquer including pine oil as an ingredient, in accordance with my invention, the following is illustrative:

|   | Per cent |
|---|---|
| Nitrocotton | 10.5 |
| Denatured alcohol | 4.5 |
| Toluene | 29.0 |
| Gum solution | 16.5 |
| Pine oil | 4.0 |
| Diethyl phthalate | 5.0 |
| Ethyl acetate | 7.5 |
| Amyl acetate | 10.0 |
| Butyl acetate | 13.0 |
|   | 100.0 |

If desired oxidized pine oil may be included in the lacquer embodying my invention and the following is illustrative of a lacquer containing oxidized pine oil:—

|   | Per cent |
|---|---|
| Nitrocotton | 10.5 |
| Denatured alcohol | 4.5 |
| Toluene | 29.0 |
| Gum solution | 16.5 |
| Pine oil | 2.0 |
| Oxidized pine oil | 2.0 |
| Diethyl phthalate | 5.0 |
| Ethyl acetate | 7.5 |
| Amyl acetate | 10.0 |
| Butyl acetate | 13.0 |
|   | 100.0 |

The lacquers including pine oil as an ingredient will be found to be of superior quality and capable of producing films of great smoothness and high gloss. The pine oil, while not a solvent of the nitrated products, constituents of lacquers, will tend to colloid nitrated products, as nitrocotton, after long contact. It, therefore, is not an active precipitant. The pine oil, as has been indicated, is a solvent for the usual gums, constituents of lacquers, and further, will blend well with the various ingredients customarily used in lacquers.

Having now fully described my invention, what I claim and desire to protect by Letters Patent is:—

1. A lacquer including nitrocellulose, pine oil unchanged chemically up to 20% and a solvent of the nitrocellulose.

2. A lacquer including nitrocellulose, pine oil unchanged chemically from 1%–10% and a solvent for the nitrocellulose.

3. A lacquer including nitrocellulose, oxidized pine oil and pine oil unchanged chemically.

In testimony of which invention, I have hereunto set my hand, at Kenvil, N. J., on this 7th day of June, 1926.

IRVIN W. HUMPHREY.